US009106785B2

(12) United States Patent
Maeda (10) Patent No.: US 9,106,785 B2
(45) Date of Patent: Aug. 11, 2015

(54) SOLID STATE IMAGE PICKUP DEVICE HAVING RECEIVED LIGHT CORRECTION UNIT, CAMERA MODULE, AND DIGITAL CAMERA

(71) Applicant: Kabushiki Kaisha Toshiba, Minato-ku (JP)

(72) Inventor: Motohiro Maeda, Oita (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 49 days.

(21) Appl. No.: 13/968,641

(22) Filed: Aug. 16, 2013

(65) Prior Publication Data

US 2014/0085516 A1 Mar. 27, 2014

(30) Foreign Application Priority Data

Sep. 24, 2012 (JP) ................................. 2012-209122

(51) Int. Cl.
*H04N 9/04* (2006.01)
*H04N 5/357* (2011.01)

(52) U.S. Cl.
CPC ............... *H04N 9/045* (2013.01); *H04N 5/357* (2013.01)

(58) Field of Classification Search
CPC ............. H04N 9/045; H04N 2209/046; G06T 3/4015; G06T 3/4007; H01L 27/14621
USPC .................................................. 348/242, 273
See application file for complete search history.

(56) References Cited

U.S. PATENT DOCUMENTS 7,113,210 B2 * 9/2006 Bloom .......................... 348/243
8,619,163 B2 * 12/2013 Ogura et al. ................... 348/242
(Continued)

FOREIGN PATENT DOCUMENTS

JP 2000-50290 2/2000
JP 2010-239192 A 10/2010
(Continued)

OTHER PUBLICATIONS

Korean Office Action issued Jun. 19, 2014, in Korea Patent Application No. 10-2013-0075119 (with English translation).
(Continued)

*Primary Examiner* — Twyler Haskins
*Assistant Examiner* — Fayez Bhuiyan
(74) *Attorney, Agent, or Firm* — Oblon, McClelland, Maier & Neustadt, L.L.P.

(57) ABSTRACT

According to an embodiment of the present invention, a solid state image pickup device is provided. The solid state image pickup device includes a plurality of photoelectric conversion elements, a light shielding unit, and a correction unit. The plurality of photoelectric conversion elements photoelectrically converts an incident light into charges corresponding to a received light amount. The light shielding unit is disposed in a light receiving surface side of a predetermined photoelectric conversion element of the plurality of photoelectric conversion elements and shields an incident light entering the predetermined photoelectric conversion element from a light receiving surface side. The correction unit corrects a received light amount of an incident light received by another photoelectric conversion element other than the predetermined photoelectric conversion element, based on a received light amount of an incident light received by the predetermined photoelectric conversion element.

15 Claims, 7 Drawing Sheets

(56) References Cited

U.S. PATENT DOCUMENTS

| | | | |
|---|---|---|---|
| 8,792,021 B2* | 7/2014 | Ishii | 348/241 |
| 8,890,981 B2* | 11/2014 | Kasai | 348/241 |

FOREIGN PATENT DOCUMENTS

| | | |
|---|---|---|
| JP | 2011-66800 A | 3/2011 |
| JP | 2011-91507 | 5/2011 |
| JP | 2011-198854 A | 10/2011 |
| JP | 2013-34086 A | 2/2013 |

OTHER PUBLICATIONS

Office Action issued Jan. 6, 2015 in Japanese Patent Application No. 2012-209122 (with English language translation).

\* cited by examiner

(54) SOLID STATE IMAGE PICKUP DEVICE HAVING RECEIVED LIGHT CORRECTION UNIT, CAMERA MODULE, AND DIGITAL CAMERA

CROSS-REFERENCE TO RELATED APPLICATION

This application is based upon and claims the benefit of priority from Japanese Patent Application No. 2012-209122, filed on Sep. 24, 2012; the entire contents of which are incorporated herein by reference.

FIELD

The present invention relates generally to a solid state image pickup device, a camera module, and a digital camera.

BACKGROUND

Conventionally, a solid state image pickup device includes a plurality of photoelectric conversion elements adapted to photoelectrically convert an incident light into an amount of charges corresponding to the received light amount. Each of the plurality of photoelectric conversion elements is associated with any one of the three primary colors in a regular manner, and a color filter adapted to selectively transmit the incident light of the associated color is provided to the light receiving surface side.

In recent years, there has been a tendency of the pitch of the pixels being finer in the wake of advancement of the increased number of the pixels and the reduced size of the solid state image pickup device. In such a way, in the solid state image pickup device, because of the finer pixel pitch, the incident light entering the photoelectric conversion element from the oblique direction may reach the neighboring photoelectric conversion element.

In such a case, the photoelectric conversion element will undesirably photoelectrically convert the incident light of the color which is not supposed to be received but travels from the oblique direction through the color filter provided in the light receiving surface side of the neighboring photoelectric conversion elements, in addition to the incident light of the color which is supposed to be received. Therefore, in the conventional solid state image pickup device, there arises a problem that the image quality of the picked up image is degraded due to the color mixture in the picked up image.

DETAILED DESCRIPTION

According to the embodiments, a solid state image pickup device is provided. The solid state image pickup device includes a plurality of photoelectric conversion elements, a light shielding unit, and a correction unit. The plurality of photoelectric conversion elements photoelectrically convert an incident light into an amount of charges corresponding to the received light amount. The light shielding unit is disposed in a light receiving surface side of a predetermined photoelectric conversion element and shields the incident light entering the predetermined photoelectric conversion element from the light receiving surface side. The correction unit corrects the received light amount of the incident light received by another photoelectric conversion element other than the predetermined photoelectric conversion element, based on the received light amount of the incident light received by the predetermined photoelectric conversion element.

A solid state image pickup device, a camera module and a digital camera according to the embodiments will be described below in detail with reference to the attached drawings. It is noted that the present invention is not limited by these embodiments. In the following embodiments, description will be provided by taking a so called back surface radiation type CMOS (Complementary Metal Oxide Semiconductor) image sensor as an example of the solid state image pickup device, in which a wiring layer is formed in the surface side opposite to the light receiving surface of the photoelectric conversion element.

It is noted that the solid state image pickup device according to the embodiments is not limited to the back surface radiation type CMOS image sensor, but may be any image sensor such as the top surface radiation type CMOS image sensor, the CCD (Charge Coupled Device) image sensor, and the like.

First Embodiment

Figure 1:
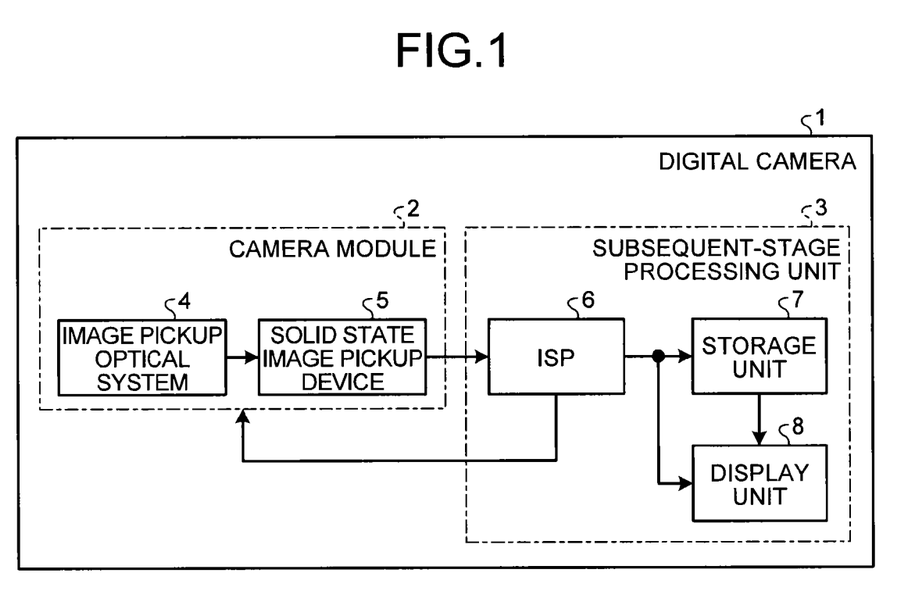
FIG. 1 is a block diagram illustrating a schematic configuration of a digital camera including a solid state image pickup device according to a first embodiment.

FIG. 1 is a block diagram illustrating a schematic configuration of a digital camera 1 including the solid state image pickup device according to the first embodiment. As illustrated in FIG. 1, the digital camera 1 includes a camera module 2 and a subsequent-stage processing unit 3.

The camera module 2 includes an image pickup optical system 4 and a solid state image pickup device 5. The image pickup optical system 4 captures a light from an object and images the object. The solid state image pickup device 5 picks up the image of the object imaged by the image pickup optical system 4 and outputs an image signal obtained by the image pickup to the subsequent-stage processing unit 3. Such camera module 2 may be applied to electronic equipment such as, for example, a camera-equipped cell phone as well as the digital camera 1.

The subsequent-stage processing unit 3 includes an ISP (Image Signal Processor) 6, a storage unit 7, and a display unit 8. The ISP 6 performs a signal processing of the image signal inputted from the solid state image pickup device 5. The ISP 6 performs signal processing, such as a lens shading correction, a defection correction, a noise reduction processing, and so on. The ISP 6 then outputs the image signal having been processed to the storage unit 7, the display unit 8, and the camera module 2. The image signal fed back from the ISP 6 to the camera module 2 is used for adjustment and/or control of the solid state image pickup device 5.

The storage unit 7 stores, as an image, the image signal inputted from the ISP 6. Further, the storage unit 7 outputs the image signal of the stored image to the display unit 8 in response to the user operation and the like. The display unit 8 displays the image according to the image signal inputted from the ISP 6 or the storage unit 7. The display unit 8 is a liquid crystal display, for example.

Figure 2:
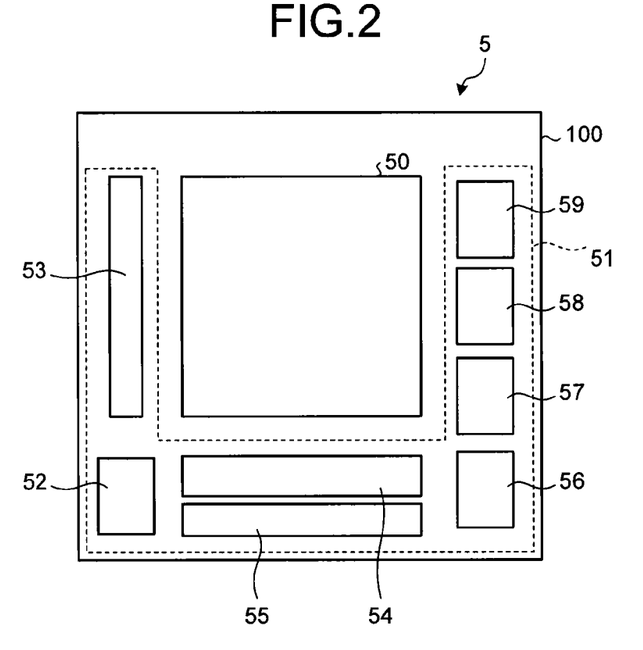
FIG. 2 is a top view illustrating the solid state image pickup device according to the first embodiment.

Next, the solid state image pickup device 5 included in the camera module 2 will be described with reference to FIG. 2. FIG. 2 is a top view illustrating the solid state image pickup device 5 (hereafter, referred to as "CMOS sensor 5") according to the first embodiment.

As illustrated in FIG. 2, the CMOS sensor 5 includes a pixel unit 50 and a logic unit 51 formed on a semiconductor substrate 100.

The pixel unit 50 includes a plurality of photoelectric conversion elements arranged in a matrix, a readout transistor, a floating diffusion, an amplification transistor, and a reset transistor.

Each photoelectric conversion element is a photodiode that converts the incident light from the object image that is imaged by the image pickup optical system 4 into an amount of charges corresponding to the received light amount and accumulates them. The readout transistor is a transistor adapted to read out the accumulated charges from each photoelectric conversion element. The floating diffusion is an area that temporarily stores the charges read out by the readout transistor.

The amplification transistor is a transistor adapted to amplify and output the charges stored in the floating diffusion. The reset transistor is a transistor adapted to reset (remove) the charges stored in the floating diffusion.

Each of the photoelectric conversion elements included in the pixel unit 50 is associated with any one of the three primary colors of red, green, and blue in a regular manner, for example. It is noted that, an example of the arrangement of the photoelectric conversion elements associated with respective colors will be described later with reference to FIG. 3, and an example of the cross-sectional structure around the photoelectric conversion elements will be described later with reference to FIG. 4 and FIG. 5.

The logic unit 51 includes a timing generator 52, a vertical selection unit 53, a horizontal selection unit 54, a sampling unit 55, a gain control unit 56, an A/D (analog/digital) converter 57, an amplifier 58, a correction unit 58, and so on.

The timing generator 52 is a processing unit adapted to output a pulse signal, which is a reference of the operation timing, to the pixel unit 50, the vertical selection unit 53, the horizontal selection unit 54, the sampling unit 55, the gain control unit 56, the A/D converter 57, the amplifier 58, the correction unit 59, and the like.

The vertical selection unit 53 is a processing unit adapted to sequentially select, on a column basis, the photoelectric conversion element for reading out the charges from the plurality of photoelectric conversion elements arranged in a matrix. The horizontal selection unit 54 is a processing unit adapted to sequentially select, on a row basis, the photoelectric conversion element for reading out the charges.

The sampling unit 55 is a processing unit adapted to read out the charges to the outside of the pixel unit 50 from the photoelectric conversion element selected by the vertical selection unit 53 and the horizontal selection unit 54, at the timing synchronized with the pulse signal outputted by the timing generator 52. The sampling unit 55 outputs, to the gain control unit 56, the image signal corresponding to the read out charges.

The gain control unit 56 is a processing unit adapted to adjust the gain of the image signal inputted from the sampling unit 55 and output it to the A/D converter 57. The A/D converter 57 is a processing unit adapted to convert the analog image signal inputted from the gain control unit 56 into a digital image signal and output it to the amplifier 58. The amplifier 58 is a processing unit adapted to amplify the digital image signal inputted from the A/D converter 57 and output it to the correction unit 59.

The correction unit 59 is a DSP (Digital Signal Processor) that is a processing unit adapted to suppress the degradation of the image quality of the picked up image by performing a correction to remove, from the digital image signal inputted from the amplifier 58, the components contained in the image signal which may cause color mixture.

Figure 3:
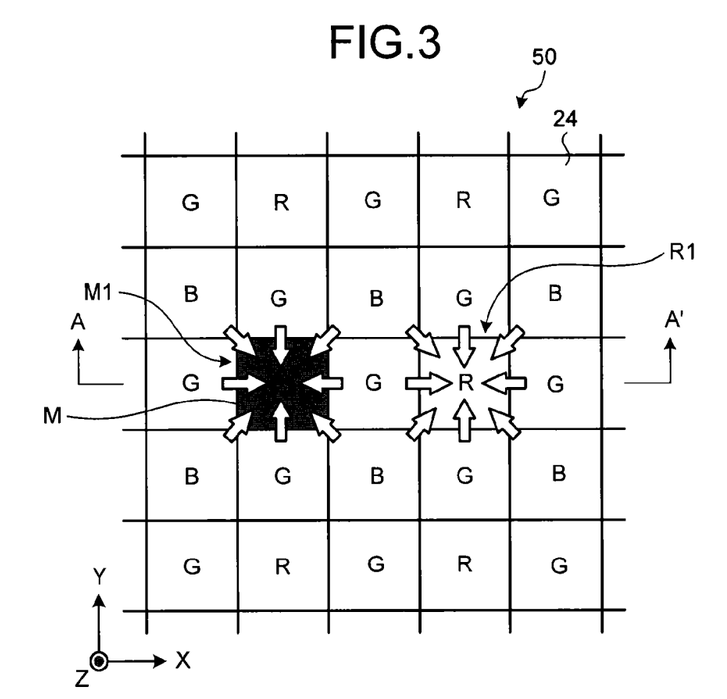
FIG. 3 is a top view schematically illustrating a part of a pixel unit according to the first embodiment.

Next, with reference to FIG. 3, described will be an example of the correction of the image signal performed by the correction unit 59. FIG. 3 is a top view schematically illustrating a part of the pixel unit 50 according to the first embodiment. It is noted that, for convenience sake, the description will be provided assuming that the positive direction of the Y axis in the orthogonal coordinate system of FIG. 3 represents the upper, the negative direction of the Y axis represents the lower, the positive direction of the X axis represents the right, and the negative direction of the X axis represents the left.

As illustrated in FIG. 3, the pixel unit 50 has the light receiving surface partitioned in a lattice manner as viewed from the above, and a photoelectric conversion element 24 is provided in each area partitioned in a lattice manner. Each photoelectric conversion element 24 is associated with any one of red, green, and blue in a regular manner as the color of the incident light to be photoelectrically converted, and color filters R, G, and B that selectively transmit the incident light of the associated color are provided in the light receiving surface side.

Herein, the color filter R selectively transmits the red incident light. The color filter G selectively transmits the green incident light. The color filter B selectively transmits the blue incident light.

In the present embodiment, the color filters R, G, and B are arranged so as to configure a Bayer arrangement. In the Bayer arrangement, a row in which the color filter G and the color filter R are arranged in an alternative manner and a row in which the color filter B and the color filter G are arranged in an alternative manner are arranged in an alternative manner in the row direction.

Hereafter, each area provided with the color filter R in the top view is referred to as the red pixel, each area provided with the color filter G in the top view is referred to as the green pixel, and each area provided with the color filter B in the top view is referred to as the blue pixel. Further, these red pixel, green pixel, and blue pixel are collectively referred to as the color pixel.

In the pixel unit 50, the photoelectric conversion element 24 of a red pixel R1 illustrated in FIG. 3 is supposed to photoelectrically convert the red incident light that is transmitted through the color filter R provided in the light receiving surface side and to accumulate the charges corresponding to the received light amount.

When the pixel pitch is finer due to the increased number of the pixels and the reduced size of the CMOS sensor 5, however, the incident light of the colors which are not supposed to be received may enter the photoelectric conversion element

24 of the red pixel R1 from the peripheral color pixels, as illustrated by the outlined arrows.

At this time, the green incident light may enter the red pixel R1 from four directions of the upper, the lower, the left, and the right in the top view, and the blue incident light may enter it from four directions of the upper-left, the lower-left, the upper-right, and the lower-right. In such a case, the photoelectric conversion element 24 of the red pixel R1 undesirably photoelectrically converts and accumulates the green and the blue incident lights traveling from the neighboring pixels through the surfaces (side surfaces) other than the light receiving surface, in addition to the red incident light that is supposed to travel and be received from the light receiving surface (top surface). In the picked up image, this causes so called color mixture by which the color of the pixel associated with the red pixel R1 is radiated brighter than is originally designed, thereby degrading an image quality.

Therefore, in the CMOS sensor 5, the light receiving surface side in a predetermined photoelectric conversion element 24 of the plurality of photoelectric conversion elements 24 included in the pixel unit 50 is provided with a pixel to which a light shielding M (hereafter, referred to as "black pixel M1") that shields the incident light traveling from the light receiving light side is disposed.

In the CMOS sensor 5, the correction unit 59 (FIG. 2 is referred) corrects the received light amount of the incident light received by the photoelectric conversion element 24 of the color pixel other than the black pixel M1 based on the received light amount of the incident light received by the photoelectric conversion element 24 of the black pixel M1.

For example, when correcting the received light amount received by the photoelectric conversion element 24 of the red pixel R1, the correction unit 59 first calculates a received light amount m of the black pixel M1 based on the digital image signal corresponding to the amount of the charges read out from the photoelectric conversion element 24 of the black pixel M1.

Here, the light shielding unit M is provided to the light receiving surface side of the photoelectric conversion element 24 of the black pixel M1. Therefore, the correction unit 59 is able to calculate, by calculating the light receiving amount m of the black pixel M1, the received light amount of the incident lights indicated by the outlined arrows that enter the photoelectric conversion element 24 of the black pixel M1 from the oblique directions (the directions other than the light receiving surface) through the neighboring color pixels.

Subsequently, the correction unit 59 calculates a received light amount r of the red pixel R1 based on the digital image signal corresponding to the charges read out from the photoelectric conversion element 24 of the red pixel R1. This received light amount r of the red pixel R1 includes the received light amount of the red incident light entering the photoelectric conversion element 24 of the red pixel R1 from the light receiving surface through the color filter R, and the received light amount of the incident lights entering it from the oblique directions (the directions other than the light receiving surface) through the neighboring color pixels.

Here, the received light amount of the incident lights entering the red pixel R1 from the neighboring color pixels and the received light amount of the incident light entering the black pixel M1 from the neighboring color pixels can be assumed to be substantially the same. Thus, the correction unit 59 subtracts the received light amount m of the black pixel M1 from the received light amount r of the red pixel R1 to correct the received light amount r of the red pixel R1.

Therefore, the components of the incident lights entering the red pixel R1 from the neighboring pixels are removed, so that the correction unit 59 is able to generate and output the digital image signal corresponding to the received light amount of the incident light entering the photoelectric conversion element 24 of the red pixel R1 from the light receiving surface through the color filter R.

Also, for the color pixels other than the red pixel R1, the correction unit 59 performs the correction of subtracting the received light amount m of the black pixel M1 from the received light amount of each color pixel, and thus generates and outputs the digital image signal in which the components of the incident lights entering each color pixel from the neighboring color pixels are removed.

Further, when outputting the digital image signal associated with the black pixel M1, the correction unit 59 outputs the image signal that is interpolated using the received light amount of the color pixel near the black pixel M1. For example, in the example illustrated in FIG. 3, the black pixel M1 is disposed at the position where the red pixel is supposed to be disposed in the Bayer arrangement. In such a case, the correction unit 59 outputs, as the digital image signal of the black pixel M1, the image signal corresponding to the corrected received light amount of the red pixel R1 near the black pixel M1.

As such, in the CMOS sensor 5, at least one black pixel M1 is provided to the pixel unit 50, and the correction unit 59 corrects the received light amount of the color pixel other than the black pixel M1 based on the received light amount of the incident light received by the photoelectric conversion element 24 of the black pixel M1. Therefore, the CMOS sensor 5 allows for the suppression of the degradation of the picked up image by removing, from the received light amount of each color pixel, the components of the received light amount of the incident lights entering each color pixel from the neighboring color pixels without causing significant reduction in the number of the effective pixels in the pixel unit 50.

Further, the CMOS sensor 5 is able to generate and output the image signal associated with the black pixel M1 by the interpolation using the corrected received light amount of the color pixel near the black pixel M1, so that the pixel defection due to the provision of the black pixel M1 can be prevented.

It is noted that, although it has been described that all the received amounts of the color pixels are corrected in the same manner using the received light amount r of one black pixel M1, the different corrections may be applied to the red pixel, the green pixel, and the blue pixel, respectively.

For example, the correction unit 59 may be configured to calculate the correction amount of the received light amount for the photoelectric conversion element 24 associated with the color other than is the color associated with the photoelectric conversion element 24 of the black pixel M1 based on the received light amount m of the incident light received by the photoelectric conversion element 24 of the black pixel M1. This allows for more accurate correction of the received light amount of each color pixel.

Specifically, when respective color pixels are arranged in a Bayer arrangement, the red pixel is provided with the blue pixel and the green pixel neighboring thereto; the green pixel is provided with the red pixel, the green pixel, and the blue pixel neighboring thereto; and the blue pixel is provided with the red pixel and the green pixel neighboring thereto. As such, among the red pixel, the green pixel, and the blue pixel, the arrangement and color of the color pixel neighboring thereto are different. Further, the wavelengths of the red, the green, and the blue incident lights are different, respectively, and the depths to which these lights enter the photoelectric conversion element 24 are different depending on the wavelength.

Thus, for example, when the black pixel M1 is disposed to the position where the red pixel is supposed to be disposed, the correction unit 59 subtracts, for each red pixel, the received light amount m of the black pixel M1 from the received light amount of each red pixel to calculate the accurate received light amount of the red pixel, as described above.

On the other hand, for the green pixel, the correction unit 59 multiplies the received light amount m of the black pixel M1 by the pre-calculated coefficient for the green pixel to calculate the correction amount, and subtracts the calculated correction amount from the received light amount of each green pixel to calculate the accurate received light amount of the green pixel.

Also, for the blue pixel, the correction unit 59 multiplies the received light amount m of the black pixel M1 by the pre-calculated coefficient for the blue pixel to calculate the correction amount, and subtracts the calculated correction amount from the received light amount of each blue pixel to calculate the accurate received light amount of the blue pixel.

It is noted that, as the coefficient for the green pixel and the coefficient for the blue pixel, the used are the proper values that are calculated based on test or simulation that takes into account of the wavelength of the color of the incident light, the transmissivity of each of the color filters R, G, and B, and so on.

This allows the correction unit 59 to correct the received light amount for each color pixel by using the accurate correction amount in which the color and/or the arrangement of the neighboring color pixel is taken into consideration. Therefore, the received light amount of each color pixel can be corrected in a high accuracy. It is noted that, although it has been described here as to the case where one black pixel M1 is provided to the pixel unit 50, a plurality of black pixels M1 may be provided within the pixel unit 50. This feature will be described later with reference to FIG. 7 and subsequent drawings.

Figure 4:
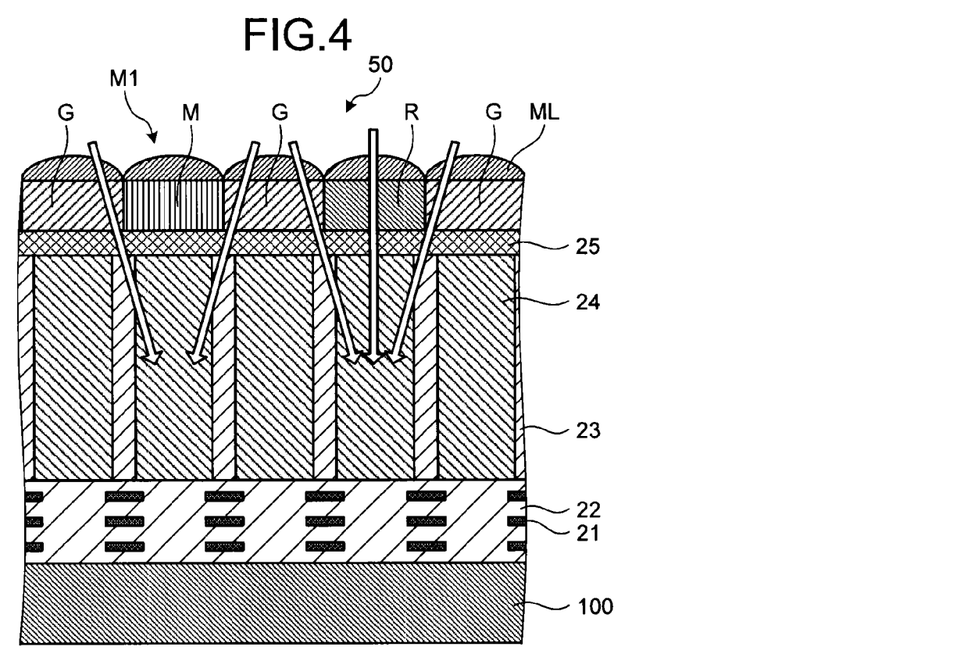
FIG. 4 is a cross-sectional view illustrating a part of the pixel unit according to the first embodiment.

Next, with reference to FIG. 4, the cross-sectional structure of the pixel unit 50 will be described. FIG. 4 is a cross-sectional view illustrating a part of the pixel unit 50 according to the first embodiment. It is noted that FIG. 4 schematically illustrates the cross section of the pixel unit 50 taken along the line A-A' of FIG. 3.

As illustrated in FIG. 4, the pixel unit 50 is provided on the semiconductor substrate 100 such as a silicon wafer, for example. The pixel unit 50 includes an interlayer insulating film 22 in which multilayered wirings 21 are embedded, a plurality of photoelectric conversion elements 24 electrically separated by element separation areas 23, respectively, and a planarization film 25, in this order from the lower layer (the layer opposite to the light receiving surface).

Further, the color filters R and G are provided over the light receiving surfaces of the color-pixel photoelectric conversion elements 24 of the plurality of photoelectric conversion elements 24 interposing the planarization film 25. On the other hand, the light shielding unit M is provided over the light receiving surface of the photoelectric conversion element 24 of the black pixel M1. Further, micro-lenses MLs configured to converge the incident light into respective photoelectric conversion elements 24 are provided on the top surface of the color filters R and G and the light shielding unit M.

The light shielding unit M is formed with a metal film having the light blocking property, such as copper, aluminum, and the like. It is noted that the material of the light shielding unit M is not limited to copper or aluminum, but any material may be used as long as it has the light blocking property, and the material having a property of reflecting the incident light may also be used.

As such, in the light receiving surface side of the photoelectric conversion element 24 of the black pixel M1, the light shielding unit M is provided to the same layer as the color filters R and G provided in the light receiving surface side of the photoelectric conversion element 24 of the color pixel. Therefore, the incident light traveling from the light receiving surface is shielded by the light shielding unit M, and the photoelectric conversion element 24 of the black pixel M1 is able to selectively receive the incident light obliquely traveling via the neighboring color pixel.

Therefore, by subtracting the received light amount of the photoelectric conversion element 24 of the black pixel M1 from the received light amount of the photoelectric conversion element 24 of the color pixel, the correction unit 59 is able to accurately calculate the received light amount of the incident light of the color that is supposed to be received by the photoelectric conversion element 24 of each color pixel.

Figure 5:
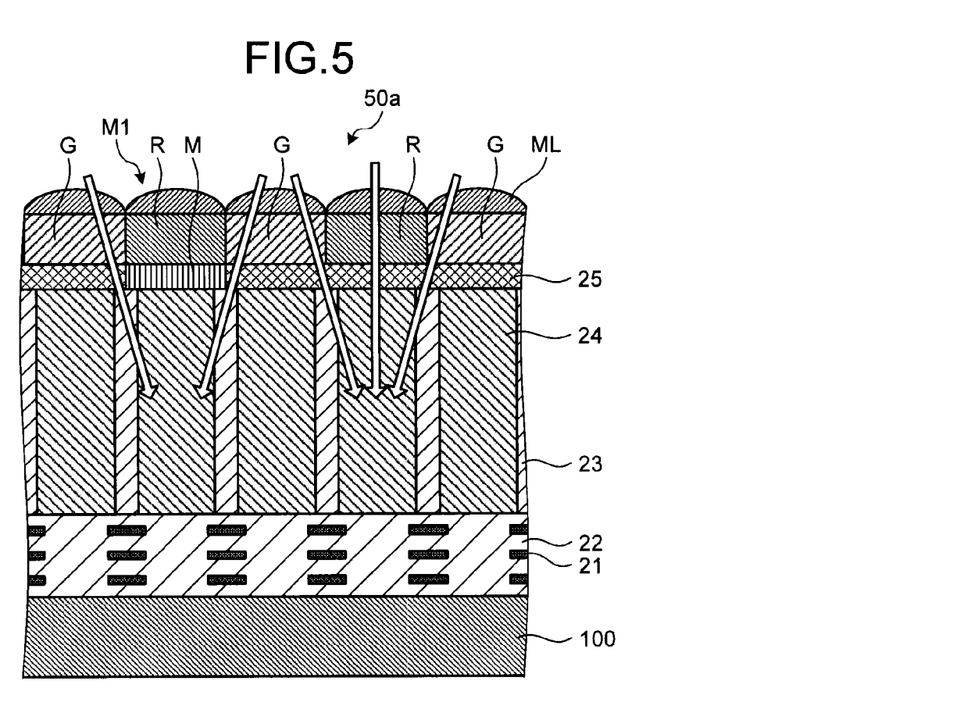
FIG. 5 is a cross-sectional view illustrating a part of the pixel unit according to a modified example of the first embodiment.

It is noted that the arrangement of the pixel unit 50 is not limited to the arrangement illustrated in FIG. 4. Then, with reference to FIG. 5, the arrangement of a pixel unit 50a according to the modified example will be described. FIG. 5 is a cross-sectional view illustrating a part of the pixel unit 50a according to the modified example of the first embodiment. It is noted that, regarding some components of FIG. 5 that have the same function as those illustrated in FIG. 4, the same reference numerals as in FIG. 4 are labeled and the description thereof will not be repeated.

As illustrated in FIG. 5, in the pixel unit 50a, the configuration of the layers upper than the photoelectric conversion element 24 are different from that illustrated in FIG. 4, while the configuration of the layers lower than the planarization film 25 are the same as that illustrated in FIG. 4. Therefore, the described here will be the configuration of the layers upper than the photoelectric conversion element 24 of the pixel unit 50a.

In the pixel unit 50a, the planarization film 25 is provided on the light receiving surfaces of the photoelectric conversion elements 24 of the color pixels, while the light shielding unit M is provided on the light receiving surface of the black pixel M1. That is, the light shielding unit M is provided in the light receiving surface side of the photoelectric conversion element 24 of the black pixel M1 and to the same layer as the planarization films 25 that are provided on the light receiving surfaces of the photoelectric conversion elements 24 of the color pixels.

Due to the presence of the light shielding unit M, the incident light traveling from the light receiving surface is shielded by the light shielding unit M, and the photoelectric conversion element 24 of the black pixel M1 is able to selectively receive the incident light obliquely traveling via the neighboring color pixel.

Therefore, by subtracting the received light amount of the photoelectric conversion element 24 of the black pixel M1 from the received light amount of the photoelectric conversion element 24 of the color pixel, the correction unit 59 is able to accurately calculate the received light amount of the incident light of the color that is supposed to be received by the photoelectric conversion element 24 of each color pixel.

Further, in the pixel unit 50a, the light shielding unit M is provided to the position corresponding to the black pixel M1 in the layer where the planarization film 25 is also provided. This allows the light shielding unit M to be used as an alignment mark when the color filters R, G, and B, the micro-lens ML, and the like are formed in the layer upper than the planarization film 25.

That is, when the pixel unit 50a is formed, the color filters R, G, and B and the micro-lenses MLs are sequentially formed after the planarization film 25 and the light shielding unit M are formed on the photoelectric conversion elements 24. At this time, the color filters R, G, and B and the micro-lenses MLs are required to be formed with an accurate positioning on the corresponding photoelectric conversion elements 24.

Therefore, in the case where the pixel unit is formed, in general, the alignment mark for aligning the forming position of the color filters and the micro-lenses is formed on the semiconductor substrate.

In contrast, in the pixel unit 50a, for example, after the planarization film 25 is formed on the photoelectric conversion elements 24, the light shielding unit M is formed by forming an opening at a predetermined position of the planarization film 25 to expose the light receiving surface of the photoelectric conversion element 24 of the black pixel M1 and then embedding copper or aluminum in the opening.

As such, in the case where the pixel unit 50a is formed, the opening is formed in the planarization film 25. Therefore, the light receiving surface of the photoelectric conversion element 24 of the black pixel M1 is exposed, so that the accurate position of the light receiving surface of the photoelectric conversion element 24 can be obtained. The light shielding unit M is then formed at the accurate position on the light receiving surface.

Therefore, in the case where the pixel unit 50a is formed, the use of the light shielding unit M as the alignment mark allows the color filters R, G, and B and the micro-lenses MLs to be accurately positioned and formed without requiring to form additional alignment mark.

It is noted that, when formed in the same layer as the planarization film 25, the light shielding unit M is not limited to the shape illustrated in FIG. 5. For example, the light shielding unit M may be formed to have a side surface tapered from the top surface toward the under surface, so that its shape of the under surface matches the shape of the light receiving surface of the photoelectric conversion element 24 of the black pixel M1 and its shape of the top surface matches the shape of the under surface of the color filter R of the black pixel M1.

Such shape allows the photoelectric conversion element 24 of the black pixel M1 to further receive the incident light that travels from the neighboring color pixel via the position quite close to the lower end of the side surface of the color filter R provided on the top surface of the light shielding unit M.

Thereby, the received light amount of the incident light entering the photoelectric conversion element 24 of each color pixel from the oblique direction via the neighboring color pixel is more accurately reflected to the received light amount of the photoelectric conversion element 24 of the black pixel M1. Therefore, the taper-shaped side surface of the light shielding unit M as described above allows the correction unit 59 to more accurately correct the received light amount of each color pixel, so that the degradation in the image quality of the picked up image can be further suppressed.

Figure 6:
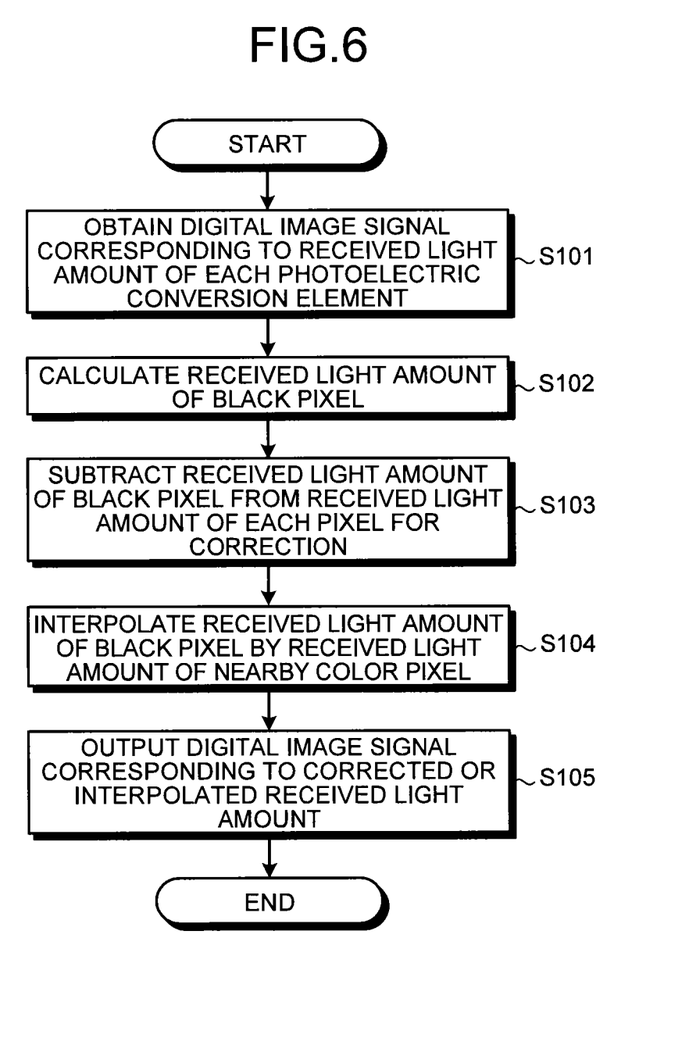
FIG. 6 is a flowchart illustrating an example of a process executed by a correction unit according to the first embodiment.

Next, with reference to FIG. 6, an example of the process performed by the correction unit 59 will be described. FIG. 6 is a flowchart illustrating an example of the process executed by the correction unit 59 according to the first embodiment.

As illustrated in FIG. 6, the correction unit 59 obtains, from the amplifier 58, a digital image signal corresponding to the received light amount of each photoelectric conversion element 24 (step S101). Then, the correction unit 59 extracts the image signal of the black pixel M1 from the obtained image signal and calculates the received light amount of the black pixel M1 (step S102).

Subsequently, the correction unit 59 calculates the received light amount of each color pixel and performs the correction for subtracting the received light amount m of the black pixel M1 from the calculated received light amount of each color pixel (step S103). Then, the correction unit 59 performs the process for interpolating the received light amount m of the black pixel M1 by the received light amount of the color pixel near the black pixel M1 (step S104).

In this step, the correction unit 59 performs the interpolation process for determining, as the received light amount received by the photoelectric conversion element 24 of the black pixel M1, the received light amount of the peripheral photoelectric conversion element 24 associated with the same color as is associated with the photoelectric conversion element 24 of the black pixel M1.

Then, the correction unit 59 outputs the digital image signal corresponding to the received light amount of each color pixel that has been corrected at step S103 and the digital image signal corresponding to the received light amount of the black pixel M1 that has been interpolated at step S104 (step S105), and completes the process.

As described above, the solid state image pickup device according to the first embodiment includes the plurality of photoelectric conversion elements, the light shielding unit, and the correction unit. The plurality of photoelectric conversion elements photoelectrically convert the incident light into the charges corresponding to the received light amount. The light shielding unit is disposed in the light receiving surface side of a predetermined photoelectric conversion element of the plurality of photoelectric conversion elements, and shields the incident light entering the predetermined photoelectric conversion element from the light receiving surface side. The correction unit corrects the received light amount of the incident light received by the photoelectric conversion elements other than the predetermined photoelectric conversion element, based on the received light amount of the incident light received by the predetermined photoelectric conversion element.

According to the above solid state image pickup device, the received light amount of the incident light received by the surfaces other than the light receiving surface can be subtracted from the received light amount received by the photoelectric conversion elements other than the predetermined photoelectric conversion element, so that the degradation in the image quality of the picked up image can be suppressed.

Second Embodiment

Figure 7:
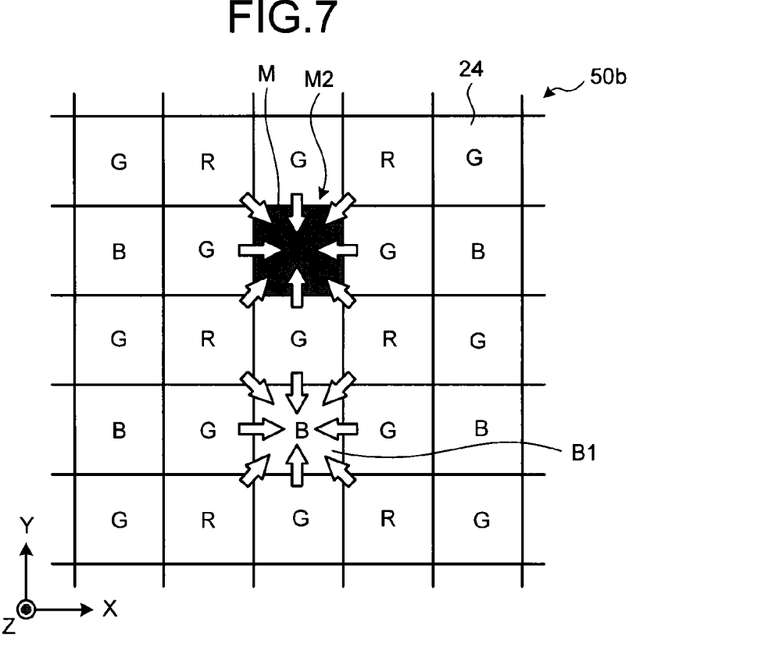
FIG. 7 and FIG. 8 are top views illustrating a part of a pixel unit according to a second embodiment.
Figure 8:
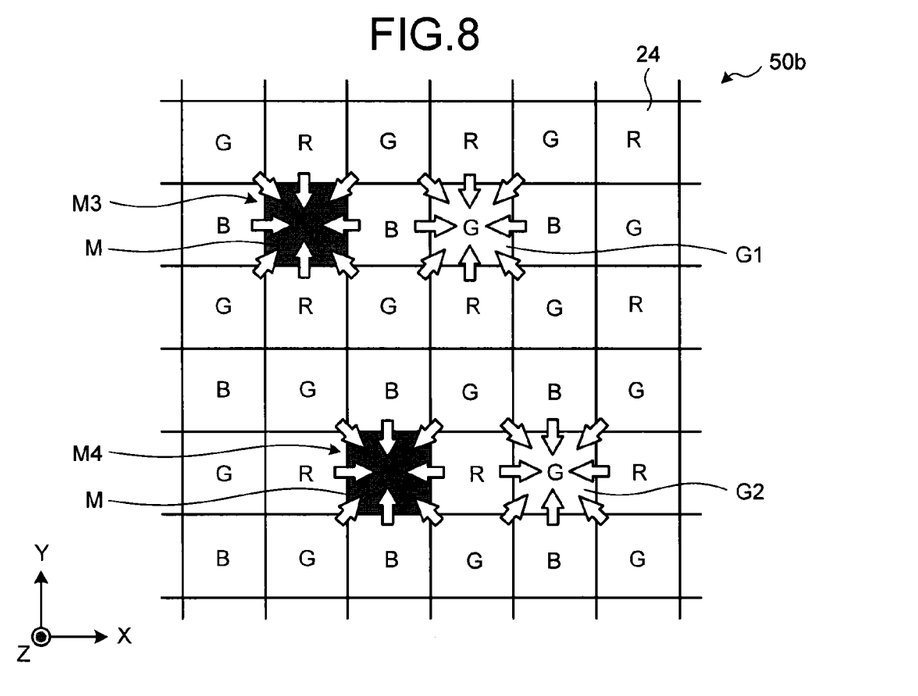

Next, the CMOS sensor according to a second embodiment will be described. The CMOS sensor of the second embodiment is different in the configuration of the pixel unit from the CMOS sensor 5 of the first embodiment. With reference to FIG. 7 and FIG. 8, the pixel unit 50b according to the second embodiment will be described.

FIG. 7 and FIG. 8 are top views illustrating a part of the pixel unit 50b according to the second embodiment. It is noted that, for convenience sake, the description will be provided assuming that the positive direction of the Y axis in the orthogonal coordinate system of FIG. 7 and FIG. 8 represents the upper, the negative direction of the Y axis represents the lower, the positive direction of the X axis represents the right, and the negative direction of the X axis represents the left.

In the CMOS sensor according to the second embodiment, at least one predetermined photoelectric conversion element 24 on which the light shielding unit M is disposed in the light receiving surface side is provided for each color to be associated. That is, the pixel unit 50*b* includes one or more black pixels provided to the position where the red pixel is supposed to be disposed, one or more black pixels provided to the position where the green pixel is supposed to be disposed, and one or more black pixels provided to the position where the blue pixel is supposed to be disposed.

Specifically, as illustrated in FIG. 7, in the pixel unit 50*b*, a black pixel M2 for blue is provided to the position where the green pixels are disposed to the upper, the lower, the left, and the right and the red pixels are disposed to the upper-left, the upper-right, the lower-left, and the lower-right, that is, the position where the blue pixel is supposed to be disposed. Further, in the pixel unit 50*b*, although not illustrated herein, the black pixel M1 for red is provided to the position of the black pixel M1 illustrated in FIG. 3, that is, the position where the red pixel is supposed to be disposed.

Further, as illustrated in FIG. 8, there are two positions where the green pixels are supposed to be provided, one of which is a first green pixel position where the red pixels are disposed to the upper and the lower and the blue pixels are disposed to the left and the right, and the other is a second green pixel position where the blue pixels are disposed to the upper and the lower and the red pixels are disposed to the left and the right.

Therefore, in the pixel unit 50*b*, a first black pixel M3 for green is provided to the first green pixel position where the green pixel is supposed to be disposed, and a second black pixel M4 for green is provided to the second green pixel position where the green pixel is supposed to be disposed.

In the case where the pixel unit 50*b* is configured as described above, the correction unit 59 subtracts the received light amount of the black pixel M1 for red from the received light amount of the red pixel R1 (see FIG. 3) to correct the received light amount of the red pixel R1. Also, the correction unit 59 subtracts the received light amount of the black pixel M2 for blue from the received light amount of a blue pixel B1 to correct the received light amount of the blue pixel B1.

Furthermore, the correction unit 59 subtracts the received light amount of the black pixel M3 for green from the received light amount of the green pixel G1 located at the first green pixel position to correct the received light amount of the green pixel G1 located at the first green pixel position. Also, the correction unit 59 subtracts the received light amount of the black pixel M4 for green from the received light amount of a green pixel G2 located at the second green pixel position to correct the received light amount of the green pixel G2 located at the second green pixel position.

It is noted that, the correction unit 59 interpolates the received light amount of the black pixel M1 for red based on the corrected received light amount of the red pixel R1, and interpolates the received light amount of the black pixel M2 for blue based on the corrected received light amount of the blue pixel B1. Similarly, the correction unit 59 interpolates the received light amounts of the first black pixel M3 and the second black pixel M4 for green based on the corrected received light amounts of the green pixels G1 and G2.

As such, in the solid state image pickup device according to the second embodiment, at least one predetermined photoelectric conversion element, in which the light shielding unit is provided in the light receiving surface side, is provided for each color to be associated. Further, based on the received light amount of the incident light received by the predetermined photoelectric conversion element, the correction unit corrects the received light amount of the incident light received by the photoelectric conversion element associated with the same color as is associated with the predetermined photoelectric conversion element.

Therefore, the solid state image pickup device according to the second embodiment is able to correct the received light amount of each photoelectric conversion element according to the arrangement of the color associated with the photoelectric conversion elements adjacent to each photoelectric conversion element, so that the degradation of the image quality of the picked up image can be further suppressed.

Third Embodiment

Next, with reference to FIG. 9 and FIG. 10, a CMOS sensor according to a third embodiment will be described. A pixel unit 50*c* of the CMOS sensor of the third embodiment further includes another black pixel for correcting the received light amount of the color pixel adjacent to the black pixel M1 in addition to the same black pixel M1 as provided in the pixel unit 50 of the first embodiment.

Figure 9:
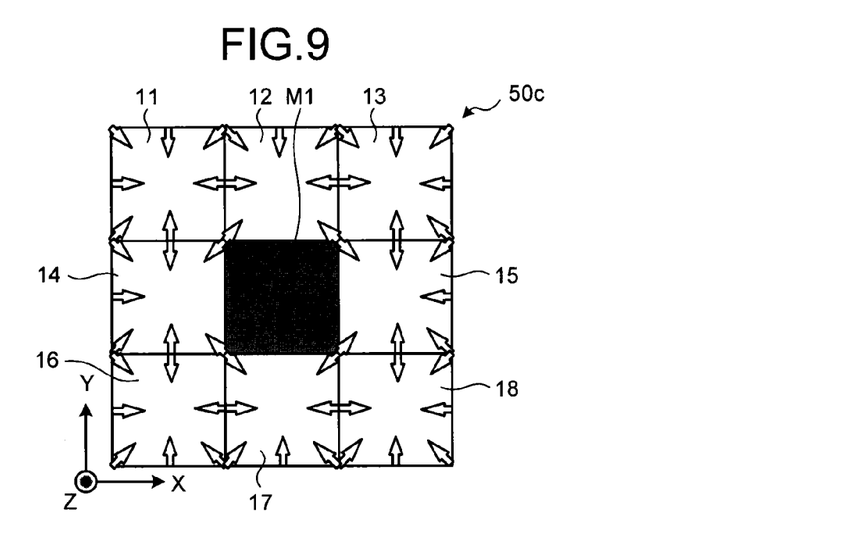
FIG. 9 and FIG. 10 are top views illustrating a part of a pixel unit according to a third embodiment.
Figure 10:
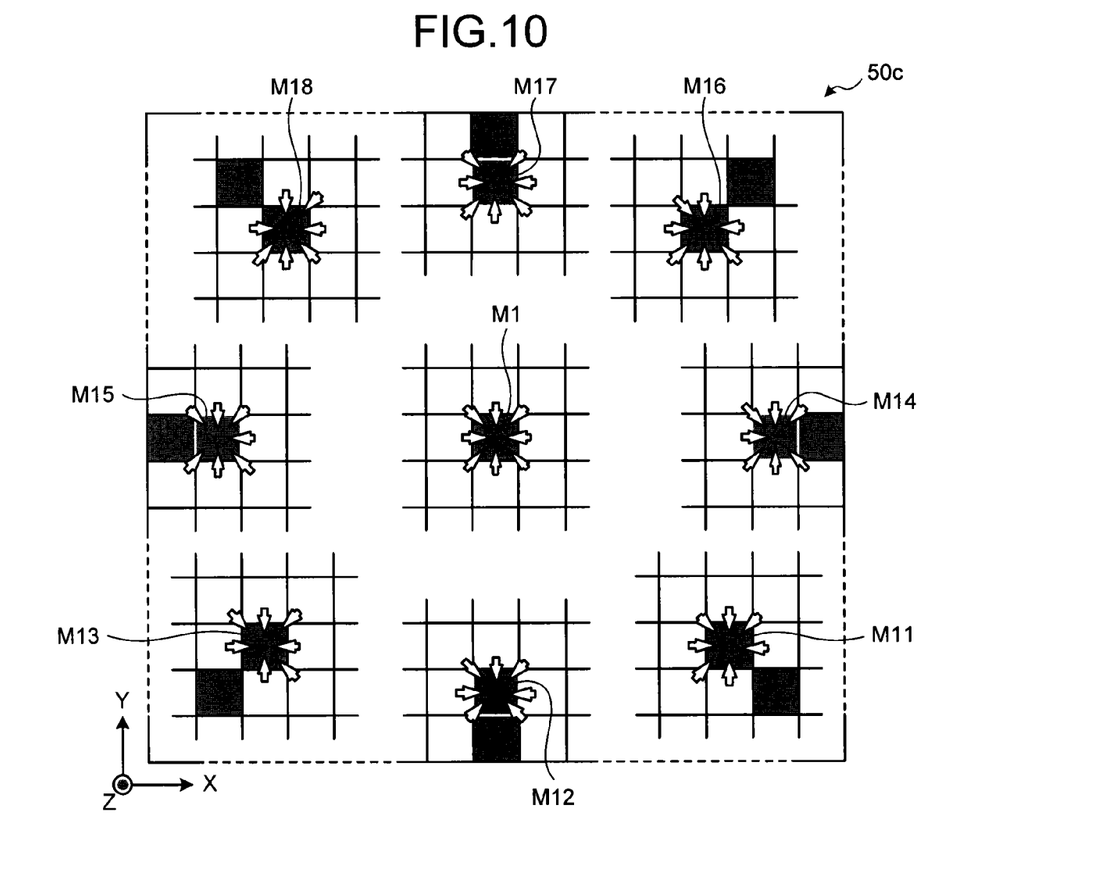

FIG. 9 and FIG. 10 are top views illustrating a part of the pixel unit 50*c* according to the third embodiment. It is noted that, for convenience sake, the description will be provided assuming that the positive direction of the Y axis in the orthogonal coordinate system of FIG. 9 and FIG. 10 represents the upper, the negative direction of the Y axis represents the lower, the positive direction of the X axis represents the right, and the negative direction of the X axis represents the left.

As illustrated in FIG. 9, the pixel unit 50*c* includes the black pixel M1 surrounded by the color pixels 11 to 18. However, the incident light that is not supposed to be received is likely to enter the color pixel 11 from the directions other than the lower-right.

Further, the incident light that is not supposed to be received is likely to enter the color pixel 12 from the directions other than the lower direction, similarly, the color pixel 13 from the directions other than the lower-left direction, the color pixel 14 from the directions other than the right direction, the color pixel 15 from the directions other than the left direction, the color pixel 16 from the directions other than the upper-right direction, the color pixel 17 from the directions other than the upper direction, and the color pixel 18 from the directions other than the upper-left direction.

Thus, in order to more accurately correct the received light amount of the color pixels 11 to 18 disposed around the black pixel M1, it is necessary to obtain the received light of the incident light that is not supposed to be received by these color pixels 11 to 18.

Therefore, the pixel unit 50*c* according to the third embodiment is provided with eight black pixels M11 to M18 close to the peripheral portions in addition to the black pixel M1, as illustrated in FIG. 10. Further, the black pixels are provided in the lower-right to the black pixel M11, in the lower to the black pixel M12, in the lower-left to the black pixel M13, in the right to the black pixel M14, in the left to the black pixel M15, in the upper-right to the black pixel M16, in the upper to the black pixel M17, and in the upper-left to the black pixel M18, respectively.

Thereby, the black pixel M11 receives the incident light traveling from the directions other than the lower-right, so do the black pixel M12 from the direction other than the lower, the black pixel M13 from the direction other than the upper-left, the black pixel M14 from the direction other than the right, the black pixel M15 from the direction other than the left, the black pixel M16 from the direction other than the upper-right, the black pixel M17 from the direction other than the upper, and the black pixel M18 from the direction other than the upper-left. That is, the black pixels M11 to M18 receive the incident lights illustrated in FIG. 9 that are not supposed to be received by the color pixels 11 to 18, respectively.

Therefore, the correction unit 59 is able to accurately correct the received light amount of the color pixel 11 by subtracting the received light amount of the black pixel M11 from the received light amount of the color pixel 11. Similarly, the correction unit 59 is able to accurately correct each received light amount of the color pixels 12 to 18 by subtracting each received light amount of the black pixels M12 to M18 from each received light amount of the color pixels 12 to 18.

As described above, according to the solid state image pickup device of the third embodiment, the accurate correction can be made also for the received light amounts of the color pixels disposed around the black pixel, so that the degradation in the image quality of the picked up image can be further suppressed.

Fourth Embodiment

Figure 11:
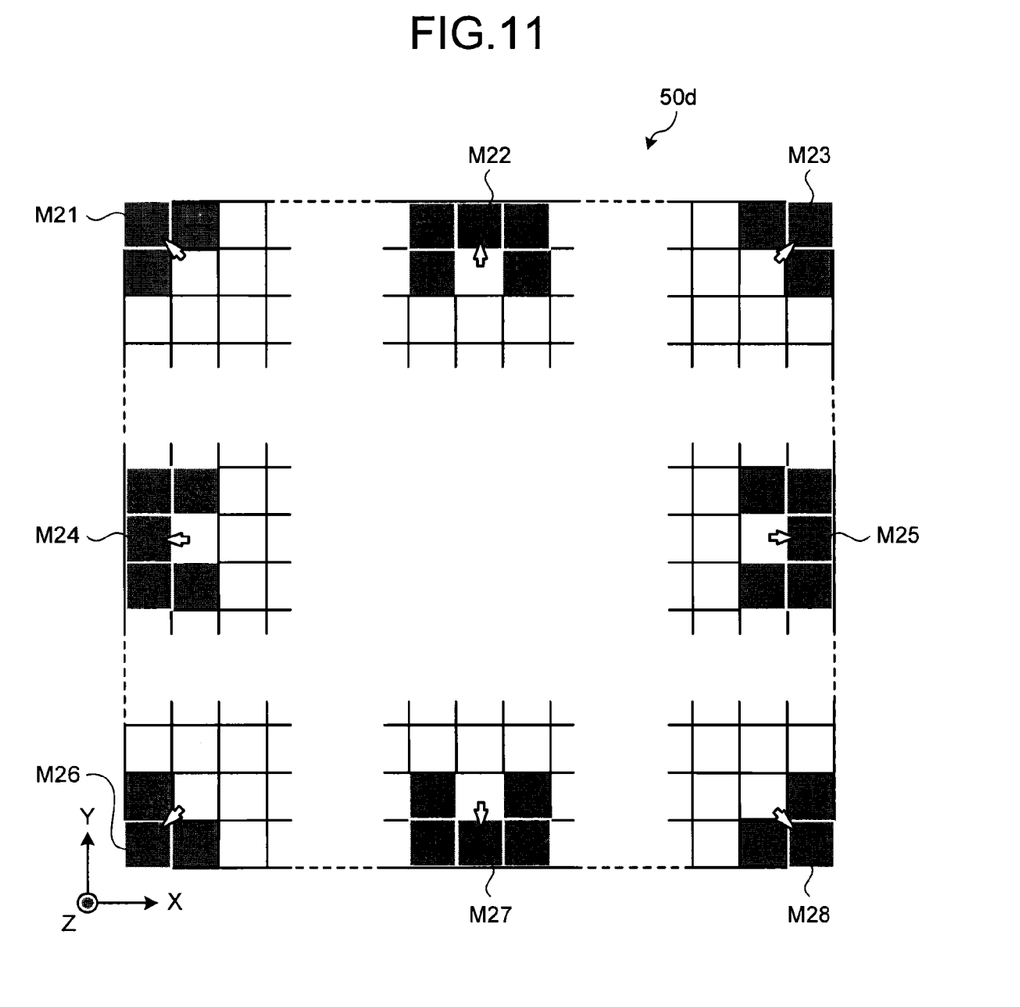
FIG. 11 is a top view illustrating a part of a pixel unit according to a fourth embodiment.

Next, with reference to FIG. 11, a CMOS sensor according to a fourth embodiment will be described. FIG. 11 is a top view illustrating a part of a pixel unit 50d according to the fourth embodiment. It is noted that, for convenience sake, the description will be provided assuming that the positive direction of the Y axis in the orthogonal coordinate system of FIG. 11 represents the upper, the negative direction of the Y axis represents the lower, the positive direction of the X axis represents the right, and the negative direction of the X axis represents the left.

As illustrated in FIG. 11, the pixel unit 50d is provided with eight black pixels M21 to M28 in its peripheral portion. Specifically, the black pixel M21 is provided to the upper-left corner of the pixel unit 50d, the black pixel M23 is provided to the upper-right corner of the pixel unit 50d, the black pixel M26 is provided to the lower-left corner of the pixel unit 50d, and the black pixel M28 is provided to the lower-right corner of the pixel unit 50d, respectively. Further, the black pixels are provided in the right and the lower to the black pixel M21, in the left and the lower to the black pixel M23, in the upper and the right to the black pixel M26, and in the upper and the left to the black pixel M28, respectively.

Also, the black pixel M22 is provided to the upper end of the pixel unit 50d, the black pixel M24 is provided to the left end of the pixel unit 50d, the black pixel M25 is provided to the right end of the pixel unit 50d, and the black pixel M27 is provided to the lower end of the pixel unit 50d. Further, the black pixels are also provided in the left, the right, the lower-left, and the lower-right to the black pixel M22, in the upper, the lower, the upper-right, and the lower-right to the black pixel M24, in the upper, the lower, the upper-left, and the lower-left to the black pixel M25, and in the left, the right, the upper-left, and the upper-right to the black pixel M27, respectively.

Thereby, the incident light selectively enters the black pixel M21 from the lower-right, the black pixel M22 from the lower, the black pixel M23 from the lower-left, the black pixel M24 from the right, the black pixel M25 from the left, the black pixel M26 from the upper-right, the black pixel M27 from the upper, and the black pixel M28 from the upper-left.

Therefore, for the color pixel around which no black pixel is located, the correction unit 59 is able to accurately correct the received light amount of each color pixel by subtracting the sum of the received light amounts of the black pixels M21 to M28 from the received light amount of each color pixel.

Further, for the color pixel around which the black pixel is located, the correction unit 59 is able to accurately correct the received light amount of each color pixel by subtracting the sum of the proper combination of some of the received light amounts of the black pixels M21 to M28 from the received light amount of each color pixel.

It is noted that the correction unit 59 interpolates the received light amount of each black pixel illustrated in FIG. 11 based on the corrected received light amount of the color pixel located around the black pixel. That is, the correction unit 59 interpolates the received light amount of the black pixel using the corrected received light amount of the photoelectric conversion element 24 in the color pixels associated with the same color as the photoelectric conversion element 24 of each black pixel.

Further, the correction unit 59 may perform the correction in which the received light amount of the black pixels M21 to M28 to be used for the correction is multiplied by a predetermined coefficient (for example, the coefficient described in the first embodiment) corresponding to the color of each color pixel adjacent to the color pixel to be corrected, and it is subtracted from the received light amount of the color pixel to be corrected.

It is noted that the black pixels illustrated in FIG. 11 may be provided to the pixel units 50, 50a, 50b, and 50c described in the first to the third embodiments. Thereby, the correction unit 59 is able to more accurately correct the received light amount of the color pixel adjacent to each black pixel by properly selecting the received light amounts of the black pixels M21 to M28 illustrated in FIG. 11 for the use in the correction.

As described above, according to the solid state image pickup device of the fourth embodiment, the received light amount of each color pixel can be accurately corrected also for any color pixel adjacent to the black pixel, so that the degradation in the image quality of the picked up image can be further suppressed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A solid state image pickup device comprising:
    a plurality of photoelectric conversion elements respectively adapted to photoelectrically convert an incident light into charges corresponding to a received light amount, the photoelectric conversion elements being associated with, as a color of an incident light to be photoelectrically converted, any one of three primary colors, respectively, in a regular manner;
    a light shielding unit disposed in a light receiving surface side of a predetermined photoelectric conversion element of the plurality of photoelectric conversion elements, and adapted to shield an incident light entering the predetermined photoelectric conversion element from a light receiving surface side; and
    a correction unit adapted to correct a received light amount of an incident light received a photoelectric conversion element associated with a color different from a color associated with the predetermined photoelectric conversion element by subtracting, from the received light amount of the photoelectric conversion element associated with the different color, a received light amount obtained by multiplying a received light amount of the incident light received by the predetermined photoelectric conversion element by a predetermined coefficient corresponding to the different color.

2. The solid state image pickup device according to claim 1, wherein the light shielding unit is provided to a same layer as a color filter provided in a light receiving surface side of the another photoelectric conversion element other than the predetermined photoelectric conversion element.

3. The solid state image pickup device according to claim 1, wherein the light shielding unit is provided to a same layer as a planarization film provided on a light receiving surface of the another photoelectric conversion element other than the predetermined photoelectric conversion element.

4. The solid state image pickup device according to claim 1, wherein the correction unit is adapted to subtract the received light amount of the incident light received by the predetermined photoelectric conversion element from the received light amount of the photoelectric conversion element associated with the same color as is associated with the predetermined photoelectric conversion element to correct the received light amount of the photoelectric conversion element associated with the same color.

5. The solid state image pickup device according to claim 4, wherein the correction unit is adapted to interpolate the received light amount of the incident light received by the predetermined photoelectric conversion element, based on a corrected received light amount of the photoelectric conversion element associated with the same color as is associated with the predetermined photoelectric conversion element.

6. The solid state image pickup device according to claim 3, wherein the light shielding unit is provided between the light receiving surface of the predetermined photoelectric conversion element and a color filter whose light receiving area is larger than the light receiving surface; and formed such that an end surface shape in the predetermined photoelectric conversion element side matches a shape of the light receiving surface of the predetermined photoelectric conversion element, an end surface shape in the color filter side matches a shape of a light receiving surface of the color filter, and an side surface is tapered from the color filter side toward the predetermined photoelectric conversion element side.

7. The solid state image pickup device according to claim 1, wherein, in a pixel unit in which the plurality of photoelectric conversion elements are formed in a matrix arrangement, the predetermined photoelectric conversion element is provided close to a peripheral area of the pixel unit.

8. The solid state image pickup device according to claim 1, wherein the light shielding unit is also provided in a light receiving side on one photoelectric conversion element of a plurality of photoelectric conversion elements that are adjacent to the predetermined photoelectric conversion element to surround the predetermined photoelectric conversion element.

9. The solid state image pickup device according to claim 1, wherein the light shielding unit is also provided in a light receiving side on other photoelectric conversion element except one photoelectric conversion element of a plurality of photoelectric conversion elements that are adjacent to the predetermined photoelectric conversion element to surround the predetermined photoelectric conversion element.

10. The solid state image pickup device according to claim 1, wherein the light shielding unit is formed with a metal film having a light blocking property.

11. The solid state image pickup device according to claim 1, wherein the light shielding unit is formed with a material having a property of reflecting an incident light.

12. The solid state image pickup device according to claim 1, wherein the light shielding unit is formed with copper or aluminum.

13. The solid state image pickup device according to claim 1, wherein the solid state image pickup device is an image sensor of a back surface radiation type.

14. A camera module comprising:
an image pickup optical system adapted to capture a light from an object and images the object; and
a solid state image pickup device adapted to pick up the image of the object imaged by the image pickup optical system,
wherein the solid state image pickup device comprises:
a plurality of photoelectric conversion elements respectively adapted to photoelectrically convert an incident light of the object imaged by the image pickup optical system into charges corresponding to a received light amount, the photoelectric conversion elements being associated with, as a color of an incident light to be photoelectrically converted, any one of three primary colors, respectively, in a regular manner;
a light shielding unit disposed in a light receiving surface side of a predetermined photoelectric conversion element of the plurality of photoelectric conversion elements, and adapted to shield an incident light entering the predetermined photoelectric conversion element from a light receiving surface side; and
a correction unit adapted to correct a received light amount of an incident light received by a photoelectric conversion element associated with a color different from a color associated with the predetermined photoelectric conversion element by subtracting, from the received light amount of the photoelectric conversion element associated with the different color, a received light amount obtained by multiplying a received light amount of the incident light received by the predetermined photoelectric conversion element by a predetermined coefficient corresponding to the different color.

15. A digital camera comprising:
a camera module including an image pickup optical system adapted to capture a light from an object and images the object and a solid state image pickup device adapted to pick up the image of the object imaged by the image pickup optical system; and
a subsequent-stage processing unit adapted to signal-process an image signal of the object image picked up by the solid state image pickup device,
wherein the solid state image pickup device comprises:
a plurality of photoelectric conversion elements respectively adapted to photoelectrically convert an incident light of the object imaged by the image pickup optical system into charges corresponding to a received light amount, the photoelectric conversion elements being associated with, as a color of an incident light to be photoelectrically converted, any one of three primary colors, respectively, in a regular manner;
a light shielding unit disposed in a light receiving surface side of a predetermined photoelectric conversion element of the plurality of photoelectric conversion elements, and adapted to shield an incident light entering the predetermined photoelectric conversion element from a light receiving surface side; and a correction unit adapted to correct a received light amount of an incident light received by a photoelectric conversion element associated with a color different from a color associated with the predetermined photoelectric conversion element by subtracting, from the received light amount of the photoelectric conversion element associated with the different color, a received light amount obtained by multiplying a received light amount of the incident light received by the predetermined photoelectric conversion element by a predetermined coefficient corresponding to the different color.

* * * * *